No. 607,111. Patented July 12, 1898.
A. B. CLUNIES.
STOVE.
(Application filed Oct. 26, 1896.)
(No Model.) 3 Sheets—Sheet 1.

Witnesses,
Thomas Durant.
Wallace Murdock.

Inventor,
Arthur B Clunies
by Church & Church
his Attys

THE NORRIS PETERS CO., PHOTO-LITHO., WASHINGTON, D. C.

No. 607,111.

A. B. CLUNIES.
STOVE.
(Application filed Oct. 26, 1896.)

(No Model.)

Patented July 12, 1898.

3 Sheets—Sheet 2.

Witnesses:
Thomas Durant
Wallace Murdock

Inventor,
Arthur B. Clunies
by Church & Church
his Attys

THE NORRIS PETERS CO., PHOTO-LITHO., WASHINGTON, D. C.

No. 607,111.  Patented July 12, 1898.
A. B. CLUNIES.
STOVE.
(Application filed Oct. 26, 1896.)
(No Model.)  3 Sheets—Sheet 3.

Witnesses:
Thomas Durant
Wallace Murdoch.

Inventor,
Arthur B Clunies
by Church & Church
his atty's.

UNITED STATES PATENT OFFICE.

ARTHUR B. CLUNIES, OF ROCHESTER, NEW YORK, ASSIGNOR TO THE SILL STOVE WORKS, OF SAME PLACE.

STOVE.

SPECIFICATION forming part of Letters Patent No. 607,111, dated July 12, 1898.

Application filed October 26, 1896. Serial No. 610,125. (No model.)

*To all whom it may concern:*

Be it known that I, ARTHUR B. CLUNIES, of Rochester, in the county of Monroe and State of New York, have invented certain new and useful Improvements in Stoves; and I hereby declare the following to be a full, clear, and exact description of the same, reference being had to the accompanying drawings, forming a part of this specification, and to the reference-numerals marked thereon.

My present invention relates to cooking-stoves, and has for its object to improve the construction and operation more particularly of the fire-pot and grate, whereby the stove is readily adapted for burning hard or soft coal or wood; and it consists in certain improvements hereinafter described, the novel features being pointed out in the claims at the end hereof.

Figure 1:
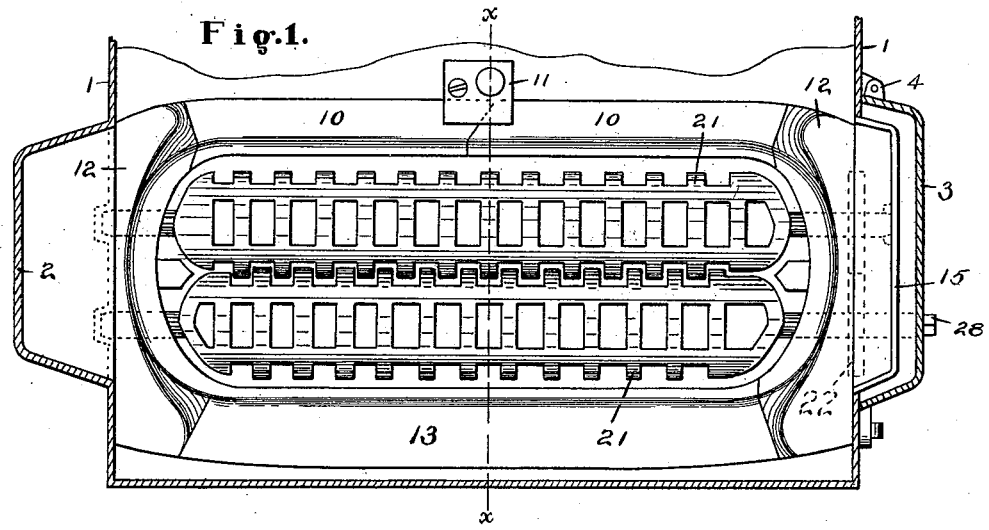
Figure 2:
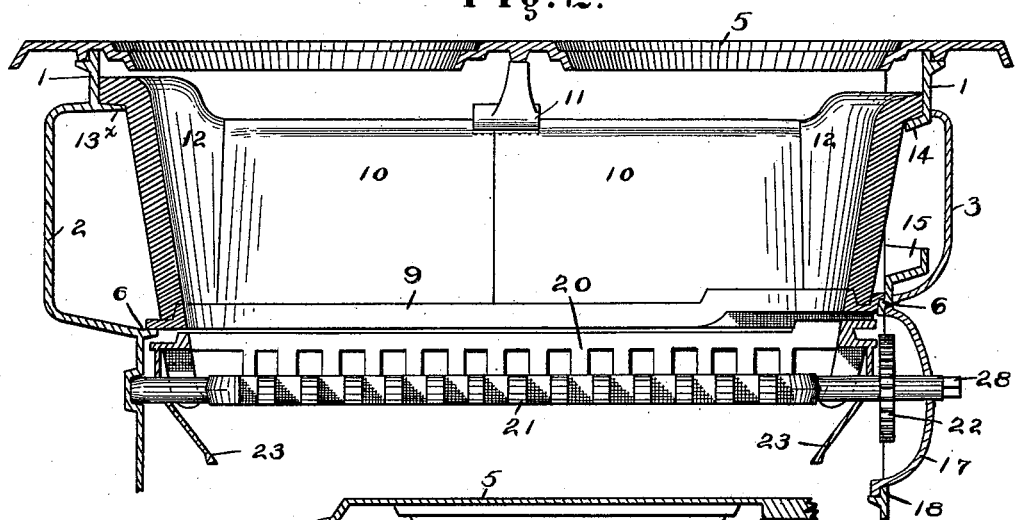
Figure 3:
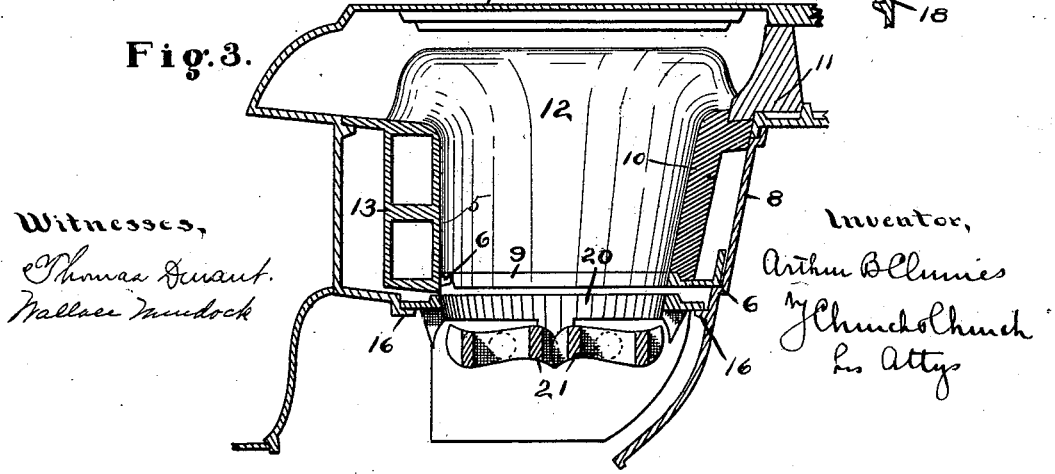
Figure 4:
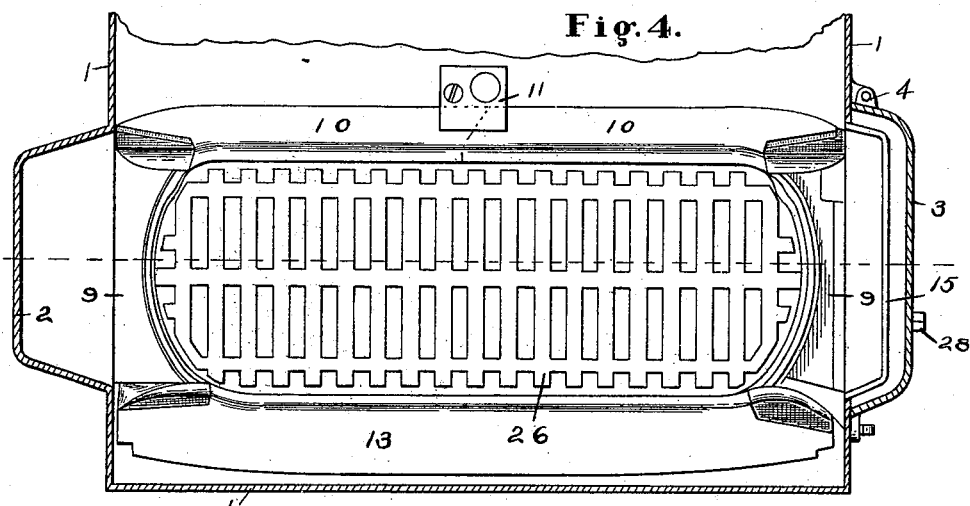
Figure 5:
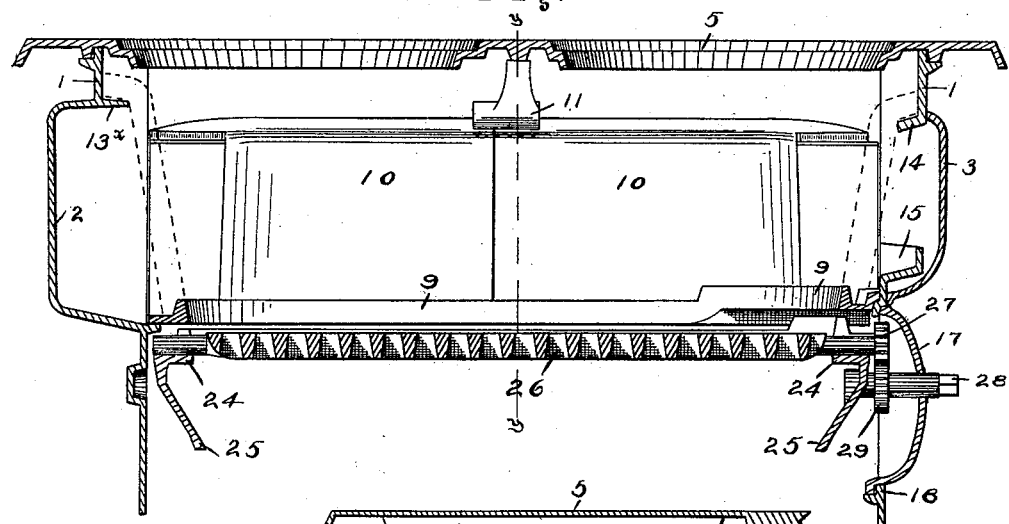
Figure 6:
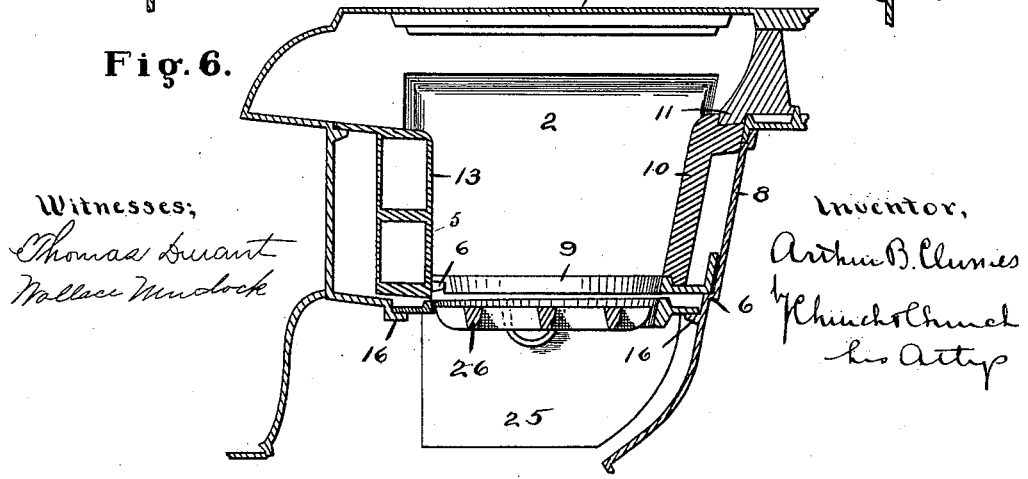
Figure 7:
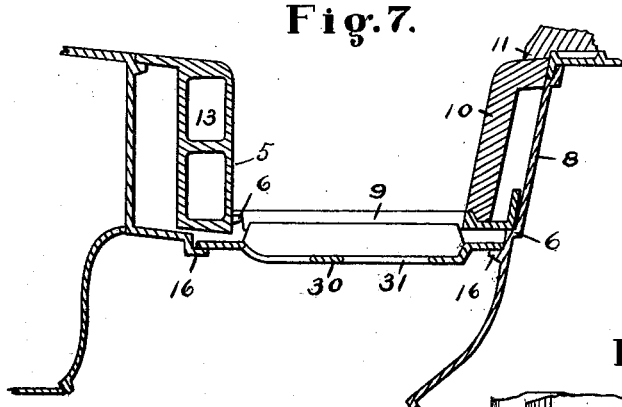
Figure 8:
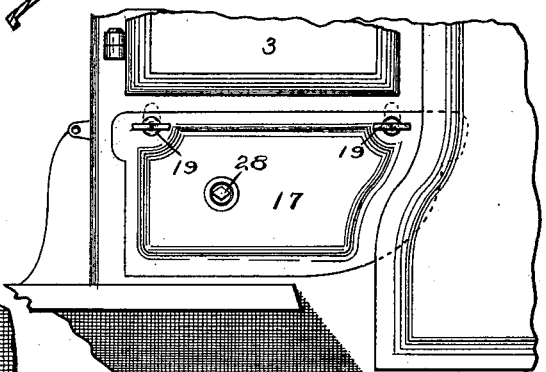

In the drawings, Figure 1 is a plan view of the fire-pot of a stove constructed in accordance with my invention, showing a duplex coal-grate in position; Fig. 2, a longitudinal sectional view; Fig. 3, a cross-sectional view on the line $x\ x$ of Fig. 1; Fig. 4, a plan view of the fire-pot when adapted for a flat dumping-grate in position; Fig. 5, a longitudinal sectional view of the same; Fig. 6, a cross-sectional view on the line $y\ y$ of Fig. 5; Fig. 7, a cross-sectional view of the fire-pot with a flat wood-grate in position; Fig. 8, a side view of the end of the ash-pit of the stove; and Fig. 9, a similar view with the outer door or plate removed and a grate such as in Figs. 4, 5, and 6 in place.

Similar reference-numerals in the several figures indicate similar parts.

Inasmuch as my present invention has to do only with the fire-pot of a cooking-stove I have not deemed it necessary to show the whole stove-frame, as those skilled in the art will readily understand the invention without it.

1 1 indicate the sides of the stove, one of which is provided with the outwardly-extending portion 2 in line with the grate and forming at times an extension of the fire-pot at one end. The corresponding extension at the other end of the fire-pot is formed in the door 3, said door being hinged at 4 and when opened permitting access to the end of the fire-pot.

5 indicates the usual stove-top, and 6 ledges or lugs formed on the stove-front 7, the side plates 1, and the rear lining-plate 8, which latter, as usual, constitutes the front of the oven. Resting upon the ledges or lugs 6 is a frame 9, extending around three sides of the fire-pot and supporting the linings thereof, which lining in the present construction embodies the rear sections 10 10, preferably of fire-brick, in two parts and secured by engaging the frame 9 and a suitable holding-piece 11 and the end bricks 12. At the front is arranged a water-front 13 or similar lining, which may or may not be supported on the frame 9, as desired. In the present embodiment it is supported from the sides and front of the stove-casing. The ends of the linings 10 and also of the front lining (as the water-front) extend to the line of the sides of the stove, but not into the extensions of the end of the fire-pot, so that the front and rear of the fire-pot is lined its whole length when the end linings 12 are removed, as in Figs. 4 and 5, while the end linings 12 when in place fit between the ends of the water-front and the rear linings 10, as in Figs. 1, 2, and 3, being supported by the frame 9 at the lower ends and at the upper ends on ledges or lugs $13^\times$ and 14, formed on the side pieces of the stove-casing. At the end of the fire-pot one of the side pieces 1 is provided with a flange 15, with the upwardly-turned edge extending out into the recessed body of the door 3, this flange being useful when wood is being burned in the stove and providing an extended fire-pot, as in Figs. 4 and 5.

It will be noted that the frame 9 is arranged to engage the lower ends of the fire-pot linings, and as its inner edge projects slightly above the extreme ends of the said linings the edges of the latter will be supported and protected, so that there is no liability of their being broken off and allowing the passage of air to the fire high up in the fire-pot.

16 16 indicate ledges, flanges, or ways formed, preferably, on the front and rear plates of the ash-pit, upon which ledges is supported the grate-frame, (to be described,) and at the end of the ash-pit and beneath the door 3 is provided a removable panel or door 17, held in place by the engagement of its lower edge with a flange 18, as in Fig. 5, while its upper end is secured by turn-buttons 19 19 or other suitable fastenings, as shown in Fig. 8. In said Fig. 8 the door or panel 17 is shown in position closing the end of the ash-pit, and in Fig. 9 the said door or panel is removed, so that the end of the grate-frame is exposed and may be readily slid out on the ways 16.

The grate-frame usually employed for burning hard coal is such a one as is shown in Figs. 1, 2, and 3, 20 indicating the frame, and 21 the grate-sections journaled in the ends thereof and provided with intermeshing gears 22, and one end of one journal is extended through a suitable aperture formed in the door or panel 17, preferably at one side of the center. The grate-frame 20 is provided at its ends with the deflecting-flanges 23, as usual.

Figure 9:
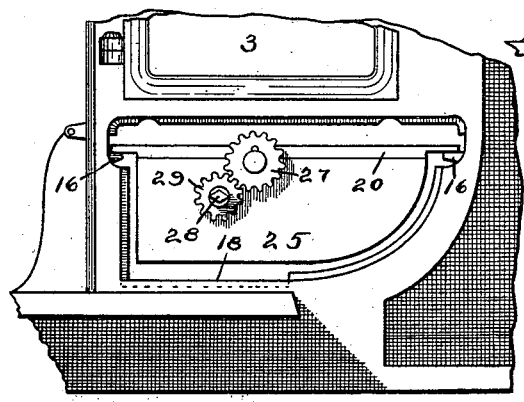

In Figs. 4, 5, and 6 I have shown another form of dumping-grate adapted to be used in this stove for burning soft coal or wood and embodying the frame 24, with the edges adapted to rest on the ledges 16 and having the flanges 25 at the ends, and the single movable grate 26, journaled in the ends of the frame and provided with a gear 27 at the center. 28 indicates a stud-arbor on the end of the grate-frame, having a gear 29 thereon meshing with the gear 27, the outer angular end of said arbor projecting through the aperture in the removable panel 17, as in Fig. 9, in the same manner that the end of the journal of one of the duplex-grate sections projects.

In Fig. 7 I have shown still another form of grate 30, adapted particularly for use when burning wood in the stove, which may also be inserted when the panel 17 is removed, this form of grate embodying, as usual, a perforated base portion with transverse ribs 31.

From the above it will be seen that when the stove is adapted for burning hard coal the linings are in position as in Figs. 1, 2, and 3, the duplex grate being in position, and it may also be readily adapted for using soft coal by leaving the linings intact and substituting the grate shown in Figs. 4, 5, and 6 for that in Figs. 1, 2, and 3, removing the panel 17, as described, for the purpose. When, however, it is desirable to burn wood in the stove, the fire-pot should be as long as possible, and then the end linings 12 are removed, as in Figs. 4, 5, and 6, and any of the forms of grates shown may be placed in position; but as it is not necessary, though desirable, I prefer that the wood-grate, as shown in Fig. 7, be inserted. When the end linings 12 are removed, the fire-pot is clear the whole length and the wood may be inserted by opening door 3, the flange 15 preventing the fuel from coming out, and the linings 10, extending to the end, as shown, prevent their being injured by the sticks of wood when thrust in the stove with the usual carelessness of domestics.

I claim as my invention—

1. In a stove for burning either wood or coal, the combination of a fire-pot provided with end extensions, a grate on which the fuel is supported, and removable end sections situated between the fire-pot and its extensions, the said fire-pot being adapted for burning coal when the end sections are in place and for burning wood when said sections are removed.

2. In a cooking-stove, the combination with the stove-casing having the fire-pot extensions at the end, the recessed door at one end and a fuel-grate arranged beneath the fire-pot, of the front and rear fire-pot linings extending to the ends but not into the extensions in the casing and door, and the removable end linings for the fire-pot located between the ends of the front and rear linings and between the fire-pot and the extension at the end thereof and in the door, substantially as described.

3. In a cooking-stove, the combination with the casing having the door at the end of the fire-pot and the removable casing-section beneath it, of the fire-pot-lining frame, the fire-pot linings at front and rear extending to the casing, and the removable lining at one end extending between the ends of the front and rear linings, said linings resting upon the frame, the supporting-ledges beneath the lining-frame, the removable grate movable on said ledges, whereby different grates may be used, and the fire-pot extended for burning wood by the removal of the end linings, substantially as described.

4. In a cooking-stove, the combination with the casing, having the fire-pot therein, the recessed door 3, the flange 15 at the end of the fire-pot extending into the recessed portion of the door, of the fire-pot-lining frame, the front and rear lining-sections extending to the casing, and the removable end lining-section, the ledges beneath the lining-frame, the grate movable thereon, and the removable casing-section for permitting the removal of the grate, substantially as described.

ARTHUR B. CLUNIES.

Witnesses:
 F. F. CHURCH,
 G. A. RODA.